United States Patent [19]

Nicol et al.

[11] Patent Number: 5,919,871
[45] Date of Patent: *Jul. 6, 1999

[54] STABILIZATION OF A POLYMER BY A STABLE FREE RADICAL

[75] Inventors: Pascal Nicol, Pau; Muriel Plechot, Orthez, both of France

[73] Assignee: Elf Atochem S.A., Puteaux, France

[*] Notice: This patent issued on a continued prosecution application filed under 37 CFR 1.53(d), and is subject to the twenty year patent term provisions of 35 U.S.C. 154(a)(2).

[21] Appl. No.: 08/597,232

[22] Filed: Feb. 6, 1996

[30] Foreign Application Priority Data

Feb. 7, 1995 [FR] France ................................. 95 01380
Jun. 13, 1995 [FR] France ................................. 95 06967

[51] Int. Cl.⁶ ....................................................... C08F 8/00
[52] U.S. Cl. ............................................................ 525/333.8
[58] Field of Search ........................................... 525/333.8

[56] References Cited

U.S. PATENT DOCUMENTS

| | | | |
|---|---|---|---|
| 3,880,822 | 4/1975 | Perrotti | 260/94.7 N |
| 4,070,419 | 1/1978 | Watson | 260/879 |
| 4,123,418 | 10/1978 | Gilg et al. | 260/45.8 NT |
| 4,672,088 | 6/1987 | Scott et al. | 524/238 |
| 5,017,458 | 5/1991 | Soda et al. | 430/296 |
| 5,185,448 | 2/1993 | Odorisio et al. | 546/186 |
| 5,322,912 | 6/1994 | Georges et al. | 526/204 |

FOREIGN PATENT DOCUMENTS

| | | |
|---|---|---|
| 135280 | 3/1985 | European Pat. Off. . |
| 0 499 581 | 8/1992 | European Pat. Off. . |
| A-0 512 951 | 11/1992 | European Pat. Off. . |
| 0 641 822 | 3/1995 | European Pat. Off. . |
| A-294 493 | 10/1991 | German Dem. Rep. . |
| A-39 17 437 | 11/1989 | Germany . |

OTHER PUBLICATIONS

Journal of Applied Chemistry of the USSR, vol. 52, No. 9, Mar. 10, 1980, pp. 1948–1951 by Kirillova et al. entitled "Stabilization of high impact polystyrene".
related pending application 08/687,643 filed on Jul. 19, 1996.
related pending application 08/597,231 filed on Feb. 6, 1996.

*Primary Examiner*—Edward J. Cain
*Attorney, Agent, or Firm*—Pennie & Edmonds LLP

[57] ABSTRACT

The present invention relates to the stabilization of a polymer by a stable free radical and in particular to the use of a stable free radical for inhibiting the degradation of a polymer by a mechanism which does not involve oxygen. This use can be carried out when the polymer is in the presence or in the absence of oxygen. The degradation which can be inhibited can be a depolymerization or a crosslinking.

52 Claims, No Drawings

STABILIZATION OF A POLYMER BY A STABLE FREE RADICAL

The present invention relates to the stabilization of a polymer by a stable free radical and in particular to the use of a stable free radical for inhibiting the degradation of a polymer by a mechanism which does not involve oxygen. This use can be implemented when the polymer is in the presence or in the absence of oxygen and/or of light.

U.S. Pat. No. 5,322,912 teaches that a stable free radical can be mixed with styrene between 100 and 160° C. so as to decrease the molecular mass and the distribution of the molecular mass of the polystyrene finally synthesized.

The article published in "Journal of Applied Chemistry of the USSR, vol. 52, No. 9, pp. 1948–1951 Mar. 10, 1980)" teaches that a piperidinoxy radical can inhibit the oxidation of polybutadiene contained in a high-impact polystyrene between 60 and 160° C.

The Applicant Company has now discovered that a stable free radical can be used to stabilize the molecular mass of a polymer, independently of the presence or not of oxygen and/or of light in its environment.

The heating of a polymer can result in modifications of its structure, such as, for example, its crosslinking or its depolymerization. These reactions can be regarded as undesirable because they can result in a detrimental change or a modification which is difficult to control of the structure and of the molecular mass of the polymer which can result in a loss of certain properties. These reactions can take place by a mechanism which involves neither oxygen nor light.

It may be desirable to avoid the crosslinking of a polymer, for example when it is desired to heat it in order to graft a chemical species onto its chains. A polymer appears more crosslinked when it is more difficult to dissolve in organic solvents such as aromatic solvents (ethylbenzene, toluene and the like) or aliphatic or alicyclic hydrocarbons (hexane, cyclohexane, and the like).

It may be desirable to avoid the depolymerization of a polymer, for example when it has to be converted while hot in order to produce a material or a component. Indeed, depolymerization is capable of modifying the properties of the final material. Moreover, the monomer generated by the depolymerization may be toxic, which can be a great nuisance, for example, if the material is intended for the food industry. Some monomers are very toxic whereas the polymer which derives therefrom is not toxic. For example, styrene is toxic whereas polystyrene is not toxic. In another example, the vinyl chloride monomer is toxic whereas poly(vinyl chloride) is not toxic.

The presence of a stable free radical in a composition comprising a polymer makes it possible to solve the above-mentioned problems and to limit the depolymerization or crosslinking of this polymer under the effect of heat. The nature of the problem, that is to say crosslinking and/or depolymerization, depends on the nature of the polymer and on the temperature to which it is intended to be exposed. Of course, within the context of the present invention, the term polymer encompasses copolymers.

The polymer may not comprise a carbon—carbon double bond. Within the context of the present invention, the mixture comprising the stable free radical may not comprise a polymer comprising a carbon—carbon double bond.

The polymer to be stabilized may not be a poly(phenylene ether). The mixture comprising the stable free radical may therefore not comprise such a resin.

It is not necessary for a costabilizer, such as one of those cited as ingredient (b) in the composition of U.S. Pat. No. 4,123,418 (the contents of which are incorporated by reference), to be present with the stable free radical.

The use according to the invention can be implemented at any pressure and, for example, at a pressure of less than 100 bars.

The nature of the problem and the temperature range within which this problem occurs are listed, in a non-exhaustive way, in the table below according to the nature of the polymer.

TABLE 1

| POLYMER | PROBLEM | TEMPERATURE RANGE |
| --- | --- | --- |
| Vinylaromatic | Depolymerization | 180 to 300° C. |
| Polyolefin | Depolymerization and crosslinking | 180 to 300° C. |
| Polydiene | Crosslinking | 80 to 150° C. |
| Acrylic | Depolymerization | 160 to 300° C. |
| Methacrylic | Depolymerization | 160 to 300° C. |

Vinylaromatic polymer is understood to mean the polymer or copolymer resulting from the polymerization or copolymerization of at least one vinylaromatic monomer. Vinylaromatic monomer is understood to mean styrene, styrene substituted on the vinyl group by an alkyl group, such as a-methylstyrene, or ortho-vinyltoluene, para-vinyltoluene, ortho-ethylstyrene, 2,4-dimethylstyrene, styrene substituted on the ring by a halogen, such as for example 2,4-dichlorostyrene, and vinylanthracene.

The vinylaromatic polymer can also be a copolymer originating from the copolymerization of at least one vinylaromatic monomer and of at least one monomer chosen from acrylonitrile, methacrylonitrile, acrylic acid, methacrylic acid, an alkyl ester in which the alkyl group contains from 1 to 4 carbon atoms, an N-alkylmaleimide in which the alkyl group contains from 1 to 4 carbon atoms, or N-phenylmaleimide.

Polyolefin is understood to mean a polymer or copolymer resulting from the polymerization or copolymerization of at least one olefin.

Olefin is understood to mean those containing from two to twenty carbon atoms and in particular the a-olefins of this group. Mention may be made, as olefin, of ethylene, propylene, 1-butene, 4-methyl-1-pentene, 1-octene, 1-hexene, 3-methyl-1-pentene, 3-methyl-1-butene, 1-decene, 1-tetradecene or their mixtures. The polyolefin can also be a copolymer originating from the copolymerization of at least one olefin and of at least one monomer chosen from vinyl esters, such as vinyl acetate or vinyl propionate, acrylic acid or acrylic or alkylacrylic esters, such as methyl acrylate or methyl methacrylate.

Polydiene is understood to mean a polymer or copolymer resulting from the polymerization or copolymerization of at least one diene and in particular a conjugated diene.

Conjugated diene is understood to mean preferably a conjugated diene comprising from 4 to 8 carbon atoms, such as 1,3-butadiene, isoprene, 2,3-dimethyl-1,3-butadiene or piperylene.

Acrylic and methacrylic polymer is understood to mean a polymer or copolymer resulting from the polymerization or copolymerization respectively of at least one acrylic monomer of formula:

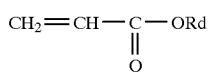

or of at least one methacrylic monomer of formula

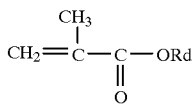

in which Rd is chosen from $C_1$–$C_{18}$ alkyl radicals, which are linear or branched and primary, secondary or tertiary, $C_5$–$C_{18}$ cycloalkyl radicals, ($C_1$–$C_{18}$) alkoxy ($C_1$–$C_{18}$) alkyl radicals, ($C_1$–$C_{18}$)alkylthio($C_1$–$C_{18}$) alkyl radicals, aryl radicals and arylalkyl radicals, these radicals optionally being substituted by at least one halogen atom and/or at least one hydroxyl group after protection of this hydroxyl group, the above alkyl groups being linear or branched. The (meth)acrylic monomer can also be chosen from glycidyl, norbornyl or isobornyl (meth)acrylates or mono- and di($C_1$–$C_{18}$) alkyl(meth)acrylamides.

Mention may be made, as examples of useful methacrylates, of methyl, ethyl, 2,2,2-trifluoroethyl, n-propyl, isopropyl, n-butyl, sec-butyl, tert-butyl, n-amyl, i-amyl, n-hexyl, 2-ethylhexyl, cyclohexyl, octyl, i-octyl, nonyl, decyl, lauryl, stearyl, phenyl, benzyl, b-hydroxyethyl, isobornyl, hydroxypropyl and hydroxybutyl methacrylates. The preferred methacrylic monomer is methyl methacrylate.

Mention may be made, as examples of acrylates of the above formula, of methyl, ethyl, n-propyl, isopropyl, n-butyl, sec-butyl, tert-butyl, hexyl, 2-ethylhexyl, isooctyl, 3,3,5-trimethylhexyl, nonyl, isodecyl, lauryl, octadecyl, cyclohexyl, phenyl, methoxymethyl, methoxyethyl, ethoxymethyl and ethoxyethyl acrylates.

The invention, of course, also relates to mixtures of polymers, such as mixtures of the polymers mentioned above. Thus, the invention also relates to compositions comprising a vinylaromatic polymer and a rubber, such as a polydiene. The invention thus relates to high-impact polystyrene, which usually comprises a polystyrene matrix and rubber nodules, the latter usually comprising polybutadiene. In such a composition, the stable free radical acts as stabilizer, acting both against depolymerization of the polystyrene phase and against crosslinking of the polybutadiene phase.

In one of its aspects, the invention relates to a process for the development of a composition or of a material comprising a polymer prepared by a polymerization or copolymerization stage, the said process comprising a stage of heating in the absence of oxygen and optionally in the absence of light. This process, which can be a use within the meaning of the present invention, is characterized in that a stable free radical is introduced so that it is present as a mixture with the polymer at the latest during the heating stage. The heating stage can be carried out at any temperature at which it is desired to stabilize the polymer. The invention preferably relates to the processes in which the heating stage is carried out between 180° C. and 300° C., more preferably between 200° and 300° C. and most preferably between 220° and 300° C.

The invention may be of advantage when, at the end of the development of a composition comprising a polymer, the producer is led to subject the said composition to hot devolatilization under vacuum so as to remove the volatile species such as the possible solvent used during the polymerization or copolymerization and the possible monomers which have not reacted during the polymerization or copolymerization. This devolatilization stage is used in processes for the industrial manufacture of compositions comprising at least one vinylaromatic monomer, such as crystal polystyrene or high-impact polystyrene. For these polymers, this stage is generally carried out between 180 and 300° C.

The stable free radical can be introduced into the polymerization or copolymerization mixture before or during the polymerization or copolymerization which must lead to the polymer.

Indeed, by introducing the stable free radical in this way, the stable free radical is present as a mixture with the polymer or copolymer and is thus present during the heating stage which the composition comprising the polymer has to be subjected to after its synthesis.

If it is desired to avoid possible disturbance which the stable free radical can cause to the polymerization or copolymerization, the stable free radical can be introduced after the polymerization or copolymerization and before or at the latest during the heating stage.

The stable free radical can be introduced into the mixture comprising the polymer to be stabilized at a temperature at which the mixture is free from radicals.

The invention is also of advantage when it is desired to convert a composition comprising a polymer within the context of the development of a material. The conversion envisaged can be an extrusion, an injection, a moulding or a blowing (film manufacture). These operations are generally carried out at a temperature above the melting temperature of the polymer and generally in the absence of oxygen.

In the case of the polymers mentioned in Table 1, this conversion is generally carried out between 180 and 300° C., except for the polydienes which it is preferable to convert between 80 and 150° C.

In another of its aspects, the invention is also of advantage when it is desired to graft, during a heating stage, a species onto a polymer. In fact, the reactions of grafting onto a polymer generally require the heating of this polymer, the chains of which can crosslink or depolymerize under the effect of the heat.

The presence of a stable free radical during this heating stage stabilizes the polymer chains while enabling grafting thereof to take place. The presence of the stable free radical furthermore makes it possible to produce grafts exhibiting more uniform lengths. The reaction of grafting onto the polymer in the presence of the stable free radical can be carried out under the usual conditions for grafting a species onto a polymer, except that the stable free radical is added at the latest during the grafting. The invention thus also relates to a process for grafting a species onto a polymer comprising a stage of preparing a mixture of a stable free radical, of the polymer and of the species to be grafted. This grafting process can be a use within the meaning of the present invention. It is not necessary, before mixing, for the polymer to comprise alkoxyamine groups. A free radical initiator can be added to the mixture. The free radical initiator can be chosen from organic peroxides and hydroperoxides, such as dibenzoyl peroxide, tert-butyl peroxybenzoate or 1,1-bis(tert-butylperoxy)cyclohexane, or azo compounds, such as azobisisobutyronitrile. The free radical initiator can be present in the grafting mixture in the proportion of 1000 to 10,000 ppm with respect to the sum of the mass of species to be grafted, of the mass of free radical initiator and of the mass of polymer. The presence of a free radical initiator is preferable but is not essential. The mixture is generally heated between 80 and 200° C. The mixture can be free of solvent.

The invention makes it possible to carry out grafting reactions onto a polymer in the absence of solvent and even during a stage of conversion of this polymer, while avoiding degradation of the polymer at the level of its main chains.

All the polymers envisaged in Table 1 can be affected by grafting reactions. The species to be used for a grafting onto a polymer can be chosen from compounds comprising at least one carbon—carbon double bond. These compounds can furthermore comprise a carbonyl

and/or hydroxyl —OH and/or epoxy and/or amino and/or alkoxysilyl group.

It can thus be a vinylaromatic monomer as already defined, a (meth)acrylic monomer as already defined, acrylonitrile, a vinyl ester, such as vinyl acetate or vinyl propionate, maleic anhydride, an unsubstituted maleimide monomer or an N-substituted maleimide monomer of formula

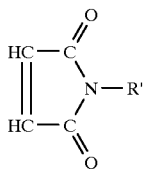

in which R' is an alkyl, arylalkyl, aryl or alkylaryl radical having from 1 to 12 carbon atoms, such as N-ethylmaleimide, N-isopropylmaleimide, N-n-butylmaleimide, N-isobutylmaleimide, N-tert-butylmaleimide, N-n-octylmaleimide, N-cyclohexylmaleimide, N-benzylmaleimide and N-phenylmaleimide, or N-cyclohexylmaleimide.

The species to be used for a grafting onto a polymer can also be chosen from sulphides and disulphides, such as thiocarboxylic acids such as mercaptoacetic acid (HOOC—CH$_2$—SH), mercaptopropionic acid (HOOC—CH$_2$—CH$_2$—SH) or dithiodipropionic acid (HOOC—CH$_2$CH$_2$—S—S—CH$_2$CH$_2$—COOH).

The stable free radical must not be confused with free radicals whose lifetime is fleeting (a few milliseconds), such as the free radicals resulting from the usual polymerization initiators such as peroxides, hydroperoxides and initiators of azo type. The free radicals which are initiators of polymerization have a tendency to accelerate polymerization. In contrast, the stable free radicals generally have a tendency to slow down polymerization. It may generally be said that a free radical is stable within the meaning of the present invention if it is not a polymerization initiator and if, under the conditions of use of the present invention, the mean lifetime of the radical is at least five minutes. During this mean lifetime, the molecules of the stable free radical continually alternate between the radical state and the state of a group bonded via a covalent bond to a polymer chain. Of course, it is preferable for the stable free radical to exhibit good stability throughout the duration of its use within the context of the present invention. Generally, the stable free radical can be isolated in the radical state at room temperature.

The family of the stable free radicals includes compounds acting as radical polymerization inhibitors, the stable nitroxide radicals, that is to say comprising the =N—O. group, such as the radicals represented by the following formulae:

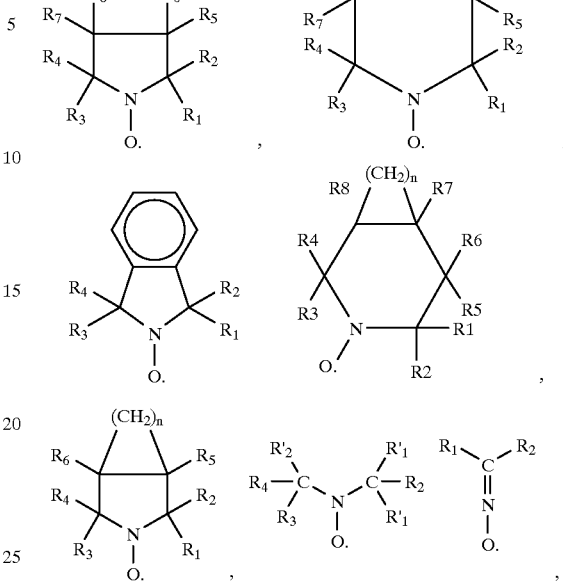

in which $R_1$, $R_2$, $R_3$, $R_4$, $R'_1$ and $R'_2$, which can be identical or different, represent a halogen atom, such as chlorine, bromine or iodine, a saturated or unsaturated, linear, branched or cyclic hydrocarbon group, such as an alkyl or phenyl radical, or an ester group —COOR or an alkoxy group —OR, or a phosphonate group —PO(OR)$_2$, or a polymer chain which can be, for example, a poly(methyl methacrylate) chain, a polybutadiene chain, a polyolefin chain, such as a polyethylene or polypropylene chain, but which is preferably a polystyrene chain, and in which $R_5$, $R_6$, $R_7$, $R_8$, $R_9$ and $R_{10}$, which can be identical or different, can be chosen from the same family of groups as that which has just been envisaged for $R_1$, $R_2$, $R_3$, $R_4$, $R'_1$ and $R'_2$, and can furthermore represent a hydrogen atom, a hydroxyl group —OH, or an acid group such as —COOH or —PO(OH)$_2$ or —SO$_3$H. The stable free radical may not comprise an unsaturation, such as a carbon—carbon double bond, because it is not necessary for it to become attached to a species of the medium via such an unsaturation.

In particular, the stable free radical can be 2,2,5,5-tetramethyl-1-pyrrolidyloxy, marketed under the tradename Proxyl, or 2,2,6,6-tetramethyl-1-piperidinyloxy, generally marketed under the name Tempo.

The stable free radical is preferably present in the mixture comprising the polymer to be stabilized in the proportion 0.05 to 0.5% by weight with respect to the sum of the mass of polymer to be stabilized and of the mass of stable free radical.

EXAMPLE 1 (COMPARATIVE)

50 g of crystal polystyrene of trademark Lacqrene 1340 marketed by the Company Elf Atochem S.A., in the form of granules which contain 160 ppm of styrene, are introduced into a 120 cm$^3$ mixing vessel after having brought the vessel to 250° C. under a nitrogen atmosphere, the said vessel, which is equipped with a cylindrical rotor with a volume of 51 cm$^3$ which rotates at 20 revolutions per minute, being of Rheomix 600 trademark and marketed by the Company Haake. The polymer melts and then itself takes the temperature of 250° C. in two minutes. The point following the two minutes is defined as the starting point of the test (time zero).

Regular withdrawals of the molten polymer are then made in order to analyse the styrene content of the polymer. Each sample withdrawn is rapidly cooled below the softening temperature (approximately 100°C.) and then, after returning to room temperature, the styrene is quantitatively determined by gas phase chromatography. To do this, the sample is first of all dissolved in dichloromethane, the polymer is then precipitated with methanol and the styrene remaining in solution in the dichloromethane is quantitatively determined by gas phase chromatography using propylbenzene as internal standard. The development with time of the styrene content due to depolymerization of the polystyrene is shown in Table 2.

EXAMPLE 2

The procedure is as in Example 1, except that, at "stime zero", 0.05 g of 2,2,6,6-tetramethyl-1-piperidinyloxy (Tempo) is introduced, i.e. approximately 0.1% of Tempo with respect to the polystyrene+Tempo mass.

The results are collated in Table 2.

EXAMPLE 3

The procedure is as in Example 1, except that, at "stime zero", 0.15 g of 2,2,6,6-tetramethyl-1-piperidinyloxy (Tempo) is introduced, i.e. approximately 0.3% of Tempo with respect to the polystyrene+Tempo mass.

The results are collated in Table 2.

EXAMPLE 4 (COMPARATIVE)

The procedure is as in Example 1, except that 50 g of poly(methyl methacrylate) of Altuglas trademark, 2773 grade, containing 2100 ppm of methyl methacrylate (MMA), are charged and except that the procedure for quantitatively determining the MMA is as follows: each sample is dissolved in acetone and the solution thus obtained is then analysed by gas phase chromatography.

The development of the MMA content as a function of time is given in Table 3.

EXAMPLE 5

The procedure is as in Example 4, except that, at "stime zero", 0.15 g of Tempo is introduced. The results are collated in Table 3.

EXAMPLE 6 (COMPARATIVE)

281 g of a styrene-butadiene diblock copolymer (of Europrene 1205 trademark) containing 25% by weight of units resulting from styrene and having a weight-average molecular mass of 147,000, in the form of a solution containing 1125 g of ethylbenzene, and then 17.9 g of mercaptopropionic acid, are introduced, under a nitrogen atmosphere at 20°C., into a 3-litre reactor equipped with a ribbon agitator and a temperature control. The whole mixture is brought to 92° C. with stirring at 200 revolutions per minute and under a pressure of 2 bars of nitrogen. 6 g of a 10% by weight solution of benzoyl peroxide in toluene are then added and 3 g of the same solution are then added one hour later. The reactor is kept stirring at this temperature for a further 3 hours, is then cooled and a copolymer carrying mercaptopropionic acid grafts (2.8% by weight of grafts, measured by infrared) is recovered by evaporation at 100° C. under vacuum. This copolymer appears crosslinked because it is insoluble in toluene and cyclohexane.

EXAMPLE 7

The procedure is as in Example 6, except that 0.44 g of Tempo is added to the reactor before heating the latter and except that the temperature is 125° C. The copolymer recovered contains 2.4% by weight of grafts derived from mercaptopropionic acid. It is entirely soluble in toluene, which indicates that the polymer has suffered very little degradation by crosslinking although the temperature was greater than that in Example 6.

EXAMPLE 8

The procedure is as in Example 7, except that the 17.9 g of mercaptopropionic acid are replaced by 17.9 g of methacrylic acid. The final copolymer contains 0.7% by weight of grafts and is soluble in toluene.

EXAMPLE 9

50 g of a styrene-butadiene diblock copolymer (Europrene 1205) are introduced into the mixing vessel described in Example 1, which vessel has been rendered inert with nitrogen and heated to 150° C. The mixing rate is 32 revolutions per minute and will be maintained at this value during the grafting. A preparation containing 0.07 g of Tempo, 1.5 g of mercaptopropionic acid and 0.16 g of benzoyl peroxide is then introduced.

The whole mixture is kept at 150° C. with stirring for 30 minutes and then cooled.

A polymer containing 0.45% by weight of grafts was thus obtained which is entirely soluble in ethylbenzene, toluene or hexane.

The results of Table 2 and of Table 3 show that there is less depolymerization (less amount of monomer) present when Tempo is present than when Tempo is not present.

TABLE 2

| | Example No. | Tempo content (weight %) | \multicolumn{8}{c}{Time (min)} |
| | | | 0 | 10 | 15 | 20 | 30 | 40 | 50 | 60 |
| --- | --- | --- | --- | --- | --- | --- | --- | --- | --- | --- |
| Styrene | 1 | 0 | 160 | 270 | 449 | 477 | 548 | 693 | 730 | 758 |
| content | 2 | 0.1 | 160 | 187 | 198 | 204 | 296 | 390 | | |
| (ppm) | 3 | 0.3 | 160 | 174 | 184 | | 223 | 235 | 268 | 277 |

TABLE 3

| | Example No. | Tempo content (weight %) | Time (min) | | | |
| | | | 0 | 5 | 10 | 15 |
| --- | --- | --- | --- | --- | --- | --- |
| MMA | 4 | 0 | 2100 | 2630 | 3900 | 5400 |
| content | 5 | 0.3 | 2100 | 2150 | 2900 | 3600 |
| (ppm) | | | | | | |

These results support a process for inhibiting the degradation of a polymer by a mechanism which does not involve oxygen comprising the step of using a stable free radical. These also support a process for the formation of a composition or of a material or of a component comprising a polymer prepared by a polymerization stage, wherein said process comprises a stage of heating between 180° C. and 300° C., in the absence of oxygen, wherein the stable free radical is introduced so that it is present as a mixture with the polymer at the latest (i.e., the radical could be introduced before a polymerization for the manufacture of polymer or after manufacture of polymer) during the heating stage. The results of Examples 6–9 support a process for grafting a species onto a polymer comprising a step of producing a mixture of a stable free radical, the polymer, and a species to be grafted.

We claim:

1. A process for inhibiting the degradation of polymer by a mechanism which does not involve oxygen comprising the step of preparation of a mixture of said polymer with a stable free radical, wherein the process is carried out without a co-stabilizer.

2. The process according to claim 1, wherein the process is carried out in the absence of oxygen.

3. The process according to claim 2, wherein the process is carried out in the absence of light.

4. The process according to claim 1, wherein the mechanism is a depolymerization.

5. The process according to claim 1, wherein the mechanism is a crosslinking.

6. The process according to claim 1, wherein the polymer is a polydiene.

7. The process according to claim 6, wherein the polymer is a polybutadiene.

8. The process according to claim 6, wherein the temperature of the process is in a range between 80° C. and 150° C.

9. The process according to claim 1, wherein there is a mixture of chemical compounds comprising a stable free radical, wherein the mixture does not comprise a polymer containing a carbon—carbon double bond.

10. The process according to claim 1, wherein the polymer is a vinylaromatic polymer.

11. The process according to claim 10 wherein the process is at a temperature between 180° C. and 300° C.

12. The process according to claim 1, wherein the polymer is an olefinic polymer.

13. The process according to claim 1 wherein the polymer is selected from the group consisting of acrylic or methacrylic polymers.

14. The process according to claim 13, wherein the process is at a temperature between 160° C. and 300° C.

15. The process according to claim 1, wherein there is a mixture of compounds comprising a stable free radical, said mixture not comprising a poly(phenylene ether).

16. The process according to claim 1, wherein the stable free radical comprises an =N—O. group.

17. The process according to claim 1, wherein there is a mixture of compounds comprising a stable free radical and said stable free radical does not comprise a carbon—carbon double bond.

18. The process according to claim 17, wherein the stable free radical does not comprise an unsaturated position through which it could be grafted onto a species of the mixture.

19. The process according to claim 1, wherein the stable free radical is present in the proportion of 0.05 to 0.5% by weight with respect to the sum of the mass of polymer to be stabilized and of the mass of stable free radical.

20. The process according to claim 1, wherein the process takes place at a pressure of less than 100 bars.

21. A process for the formation of a composition or of a material or of a component comprising a polymer prepared by a polymerization stage, wherein said process comprises a stage of heating between 180° and 300° C. in the absence of oxygen and the preparation of a mixture of said polymer with a stable free radical, wherein said stable free radical is introduced at the latest during the heating stage, wherein the process is carried out without a co-stabilizer.

22. The process according to claim 21, wherein the heating stage is carried out in the absence of light.

23. The process according to claim 21, wherein the mixture comprising the stable free radical during the heating stage does not comprise a polymer comprising a carbon—carbon double bond.

24. The process according to claim 21, wherein the mixture comprising the stable free radical during the heating stage does not comprise poly(phenylene ether).

25. The process according to claim 21, wherein the polymer is a vinylaromatic polymer.

26. The process according to claim 21, wherein the polymer is an olefinic polymer.

27. The process according to claim 21, wherein the polymer is selected from the group consisting of acrylic or methacrylic polymers.

28. The process according to claim 21, wherein the stable free radical is added after the preparation by polymerization of the polymer.

29. The process according to claim 21, wherein the heating stage is carried out between 200° C. and 300° C.

30. The process according to claim 21, wherein the heating stage is carried out a pressure of less than 100 bars.

31. The process for grafting a species onto a polymer comprising a step of producing a mixture of a stable free radical, the polymer, and the species to be grafted, wherein the stable free radical is introduced to the system as a stable free radical.

32. The process according to claim 31, wherein the polymer does not comprise an alkoxyamine group.

33. The process according to claim 31, wherein the mixture is heated between 80° C. and 200° C.

34. The process according to claim 31, wherein the mixture is free from solvent.

35. The process according to claim 31, wherein the stable free radical comprises an =N—O group.

36. The process according to claim 31, characterized in that the stable free radical does not comprise a carbon—carbon double bond.

37. The process according to claim 36, wherein the stable free radical does not comprise an unsaturated bond though which it could be grafted onto a species of the mixture.

38. The process according to claim 31, wherein the stable free radical is present in the proportion of 0.05% to 0.5% by weight with respect to the sum of the mass of polymer to be stabilized and of the mass of stable free radical.

39. The process according to claim 31, wherein a free radical initiator is added to the mixture.

40. A process for inhibiting the degradation of a polymer by a mechanism which does not involve oxygen, comprising the step of introducing a stable free radical into a polymerization mixture.

41. The process of claim 40 wherein the process is carried out without a costabilizer.

42. The process of claim 40 wherein the polymerization mixture must lead to a polymer.

43. The process of claim 40 wherein the stable free radical does not comprise a sterically hindered cyclic amine.

44. The process of claim 1 wherein the stable free radical does not comprise a sterically hindered cyclic amine.

45. The process of claim 21 wherein the stable free radical does not comprise a sterically hindered cyclic amine.

46. The process of claim 31 wherein the stable free radical does not comprise a sterically hindered cyclic amine.

47. The process according to claim 12 wherein the process is at a temperature between 180° and 300° C.

48. The process according to claim 29, wherein the heating stage is between 220° C. and 300° C.

49. The process according to claim 1, wherein the stable free radical is added after the preparation by polymerization of the polymer.

50. The process according to claim 1, wherein the stable free radical is introduced to the system as a stable free radical.

51. The process according to claim 49, wherein the stable free radical is introduced to the system as a stable free radical.

52. A process for inhibiting the degradation of a polymer comprising the step of mixing said polymer with a stable free radical, wherein the polymer is an olefinic polymer or an acrylic or methacrylic polymer.

\* \* \* \* \*

UNITED STATES PATENT AND TRADEMARK OFFICE
CERTIFICATE OF CORRECTION

PATENT NO.   :   5,919,871

DATED        :   July 6, 1999

INVENTOR(S)  :   Nicol et al.

It is certified that error appears in the above-identified patent and that said Letters Patent is hereby corrected as shown below:

(1) Column 1, line 15, amend "pp. 1948-1951 Mar. 10, 1980)" to --pp. 1948-1951 (Mar. 10, 1980)--.

(2) Column 7, line 16, amend "stime" to --time--.

(3) Column 7, line 23, amend "stime" to --time--.

(4) Column 7, line 42, amend "stime" to --time--.

(5) Column 8, line 4, amend "Europrene" to --Europrène--.

(6) Column 8, line 41, amend "Europrene" to --Europrène--.

(7) Column 9, line 49, amend "or" to --and--.

(8) Column 10, line 26, amend "or" to --and--.

(9) Column 10, line 49, amend "=N-O" to --=N-O.--.

(10) Column 10, line 54, amend "though" to --through--.

Signed and Sealed this

Fifteenth Day of February, 2000

Attest:

Q. TODD DICKINSON

*Attesting Officer*         *Commissioner of Patents and Trademarks*